United States Patent [19]
Lazzari

[11] Patent Number: 5,208,716
[45] Date of Patent: May 4, 1993

[54] MAGNETORESISTANT MAGNETIC HEAD FOR LONGITUDINAL RECORDING AND PROCESS FOR PRODUCING SUCH A HEAD

[75] Inventor: Jean-Pierre Lazzari, Corenc, France

[73] Assignee: Commissariat a l'Energie Atomique, Paris, France

[21] Appl. No.: 603,758

[22] PCT Filed: Mar. 28, 1990

[86] PCT No.: PCT/FR90/00213
§ 371 Date: Nov. 16, 1990
§ 102(e) Date: Nov. 16, 1990

[87] PCT Pub. No.: WO90/11597
PCT Pub. Date: Oct. 4, 1990

[30] Foreign Application Priority Data

Mar. 29, 1989 [FR] France ............... 89 04060

[51] Int. Cl.⁵ ............... G11B 5/127; G11B 5/33
[52] U.S. Cl. ............... 360/113; 360/122; 360/126
[58] Field of Search ............... 360/126, 122, 113

[56] References Cited

U.S. PATENT DOCUMENTS

| | | | |
|---|---|---|---|
| 4,639,289 | 1/1987 | Lazzari | 360/122 |
| 4,782,415 | 11/1988 | Vinal | 360/113 |
| 4,843,505 | 6/1989 | Mowry | 360/113 |
| 4,901,177 | 2/1990 | Lazzari | 360/113 |
| 4,922,360 | 5/1990 | Takano et al. | 360/113 |
| 4,949,207 | 8/1990 | Lazzari | 360/126 |
| 4,984,118 | 1/1991 | Springer | 360/122 |
| 4,987,509 | 1/1991 | Gill et al. | 360/113 |
| 5,025,341 | 6/1991 | Bousquet et al. | 360/126 |
| 5,081,554 | 1/1992 | Das | 360/113 |

FOREIGN PATENT DOCUMENTS 023175 1/1981 European Pat. Off.
238110 9/1987 European Pat. Off.

OTHER PUBLICATIONS

Patent Abstracts of Japan, vol. 1, No. 76, 21 Jul. 1977, p. 1039 E77 & JP-A-52 011921 (Nippon Denki K.K.) 29 Jan. 1977.
Patent Abstrcts of Japan, vol. 7, No. 42 (P-177) (1187) 19 Feb. 1983, & UP-A-57 191819 (Matsushita Denki Sangyo K.K.) Nov. 25, 1982.
Patent Abstracts of Japan, vol. 9, No. 2 (P—325) (1725) Jan. 8, 1985, & JP-A-59 151334 (Fujitsu K.K.) Aug. 29, 1984.
Patent Abstracts of Japan, vol. 6, No. 22 (P-101) (900) Feb. 9, 1982, & JP-A-56 143514 (Fujitsu K.K.) Nov. 9, 1981.
Patent Abstracts of Japan, vol. 11, No. 303 (P-622) (2750) Oct. 3, 1987, & JP-A-62 095711 (NEC CORP) May 2, 1987.
IEEE Transactions of Magnetics vol. 25, No. 5, Sep. 5, 1989, pp. 3686-3688, D. W. Chapman: "A New Approach To Making Thin Film Head-Slider Devices".

Primary Examiner—Stuart S. Levy
Assistant Examiner—Alfonso Garcia
Attorney, Agent, or Firm—Oblon, Spivak, McClelland, Maier & Neustadt

[57] ABSTRACT

Magnetoresistant magnetic reading head and process for producing the same. The head comprises a magnetoresistant strip beneath a magnetic spacer. This strip is obtained by etching using the spacer partly as a mask. Therefore, the magnetoresistant element is self-aligned with respect to the spacer and is buried beneath it. Such a device finds particular application in magnetic recording and reading.

3 Claims, 6 Drawing Sheets

MAGNETORESISTANT MAGNETIC HEAD FOR LONGITUDINAL RECORDING AND PROCESS FOR PRODUCING SUCH A HEAD

BACKGROUND OF THE INVENTION

1. Field of The Invention

The present invention relates to a magnetoresistant reading and optionally writing magnetic head for longitudinal recording and a process for producing such a head.

2. Discussion of The Background

The structure of a reading and a writing head for longitudinal recording is shown in FIG. 1. In a semiconductor substrate 10 are deposited and etched various layers (whose relative dimensions have not been respected for reasons of clarity) in order to form a magnetic circuit 12 with an air gap filled by an amagnetic spacer 14 and a conductor coil 16. The track to be written and/or read 20 passes above the air gap. Such heads are described in various different embodiments in European Patents 152 326 and 262 028 (or the corresponding U.S. Pat. No. 4 837 924).

Alongside this known thin film technology has developed a method using the properties of magnetoresistant materials. Such materials make it possible to produce reading heads for very narrow recording tracks.

FIG. 2 shows a head of this type comprising a magnetic support 1 coated with an insulating layer 2, a magnetoresistant layer 5 located beneath a slot 6 made in a magnetic layer 7. The latter is in contact with the support 1 by a rear zone 8. Therefore the layers 1,7 and 8 form a magnetic circuit with air gap 9, the circuit being interrupted by the slot 6. When a recorded track passes in front of the air gap 9, the magnetic flux detected level with the air gap in part passes through the magnetoresistor 5, which undergoes a resistance modification. Such a head is described in U.S. Pat. No. 4 703 378.

FIG. 3 shows another known head using magnetoresistors. A semiconductor support 30 has been deposited on a magnetic circuit 32 with a spacer 34. Two slots 36,37 interrupt the magnetic circuit and serve to house two magnetoresistors 38,39. Such a head is described in European Patent 284 495.

All magnetoresistance devices operating according to a general principle can be illustrated by FIGS. 4,5 and 6.

FIG. 4 shows a magnetoresistor 40 having a magnetization vector M, which, under the effect of an external magnetic field Hext, rotates by an angle $\alpha$. Therefore the resistance of the element 40 is modified. This resistance can be electrically measured through two connections 42,43. The resistance variation $\Delta R$, related to the resistance R, varies in the manner indicated in FIG. 5 as a function of the angle $\alpha$. In practice, for a 0.1 $\mu$m thick iron-nickel layer, the relative resistance varies by approximately 1% when the magnetization turns by 90°.

In order to increase the sensitivity of the measurement and improve the linearity, the magnetization of the layer is oriented to 45° so as to be able to work on the edge of the curve, in the manner shown in FIG. 6. Thus, a larger $\Delta R$ is obtained for the same $\Delta H$, the magnetization M rotating with respect to the direction by 45°.

Although the prior art devices are satisfactory in certain respects, they still suffer from certain disadvantages. In particular, they have a complex construction, particularly when it is a question of placing the magnetoresistor beneath or in the magnetic circuit slot.

SUMMARY OF THE INVENTION

The present invention aims at obviating this disadvantage by proposing a device and a process such that the magnetoresistor is automatically positioned where it should be (self-alignment).

Moreover, in the prior art magnetoresistance devices, it is difficult, although possible, to obtain at the same time a writing function.

Preference is therefore given to the use of another head, without magnetoresistance, in order to ensure the writing on the track. These devices are so-called "dual heads".

Naturally, they have a considerable degree of complexity, because it is necessary to produce two heads and these must be strictly aligned. In the case of a curved track, alignment cause considerable problems, so that such dual heads are in practice only used for tape unwinders.

With the present invention, it is possible to produce in a single head the reading and writing means, whilst preserving self-alignment. However, the head according to the present invention need only be a reading head.

Finally, the present invention leads to a supplementary advantage in that the magnetoresistant element has a length less than that of the writing air or head gap, so that reading takes place over a track width less than that of the total track. This makes it possible to improve the signal-to-noise ratio on reading.

More specifically, the present invention relates to a horizontal magnetic reading and optionally writing head comprising a magnetic circuit constituted by a horizontal, lower magnetic layer extended by two vertical connectors, a horizontal, upper magnetic layer, which is interrupted by an air gap filled by an amagnetic spacer, the latter having a certain length L and a certain width e, the head being characterized in that it also has a magnetoresistant element in the form of a ribbon placed beneath the spacer and having a width equal to the width e of the spacer and a length l less than the length L of the spacer, the ribbon being connected to two reading terminals, the head then being able to read a track written on a width l less than the width L of the written track.

Preferably, the magnetoresistant ribbon of length L is connected at its ends to two large surface magnetoresistant tapes or strips oriented perpendicular to the ribbon, the assembly of the ribbon and the two strips forming a substantially H-shaped pattern, the reading terminals being connected to a contact on the strips.

In an advantageous variant, the head is able to both read and write. It then comprises a conductor coil surrounding the two vertical connectors and connected to two writing terminals.

The present invention also relates to a process for producing the head defined hereinbefore. According to this process, in a recess etched in a semiconductor substrate is deposited a first horizontal, magnetic layer, two vertical connectors being formed at the ends of the layer, the process being characterized in that it continues with the operations of depositing a magnetoresistant material layer, the depositing of a dielectric insulating layer, the formation of an amagnetic spacer on the assembly, the spacer having a length L and a width e, the insulating layer and the magnetoresistant material layer are etched through a mask constituted by two parallel strips separated from one another by a space l smaller than the length L of the spacer, the mask being placed above the spacer and through the same and overlapping its two ends, the spacer thus also serving as a mask over a length l, the magnetoresistant material layer surmounted by the dielectric insulating layer remaining after etching along a ribbon of length l and width e, beneath the spacer and in the form of two lateral strips at the ends of the ribbon, the assembly forming a pattern having essentially a H shape, whose central bar is self-aligned with the spacer, two electric contacts are made on the magnetoresistant material layer through the dielectric insulating layer on the two lateral strips and the two contacts are connected to two reading terminals and the magnetic circuit is completed by the deposition of a horizontal magnetic layer on either side of the spacer and in contact with the connectors.

BRIEF DESCRIPTION OF THE DRAWINGS

The invention is described in greater detail hereinafter relative to non limitative embodiments and the attached drawings, wherein show.

DESCRIPTION OF THE PREFERRED EMBODIMENTS

Figure 1:
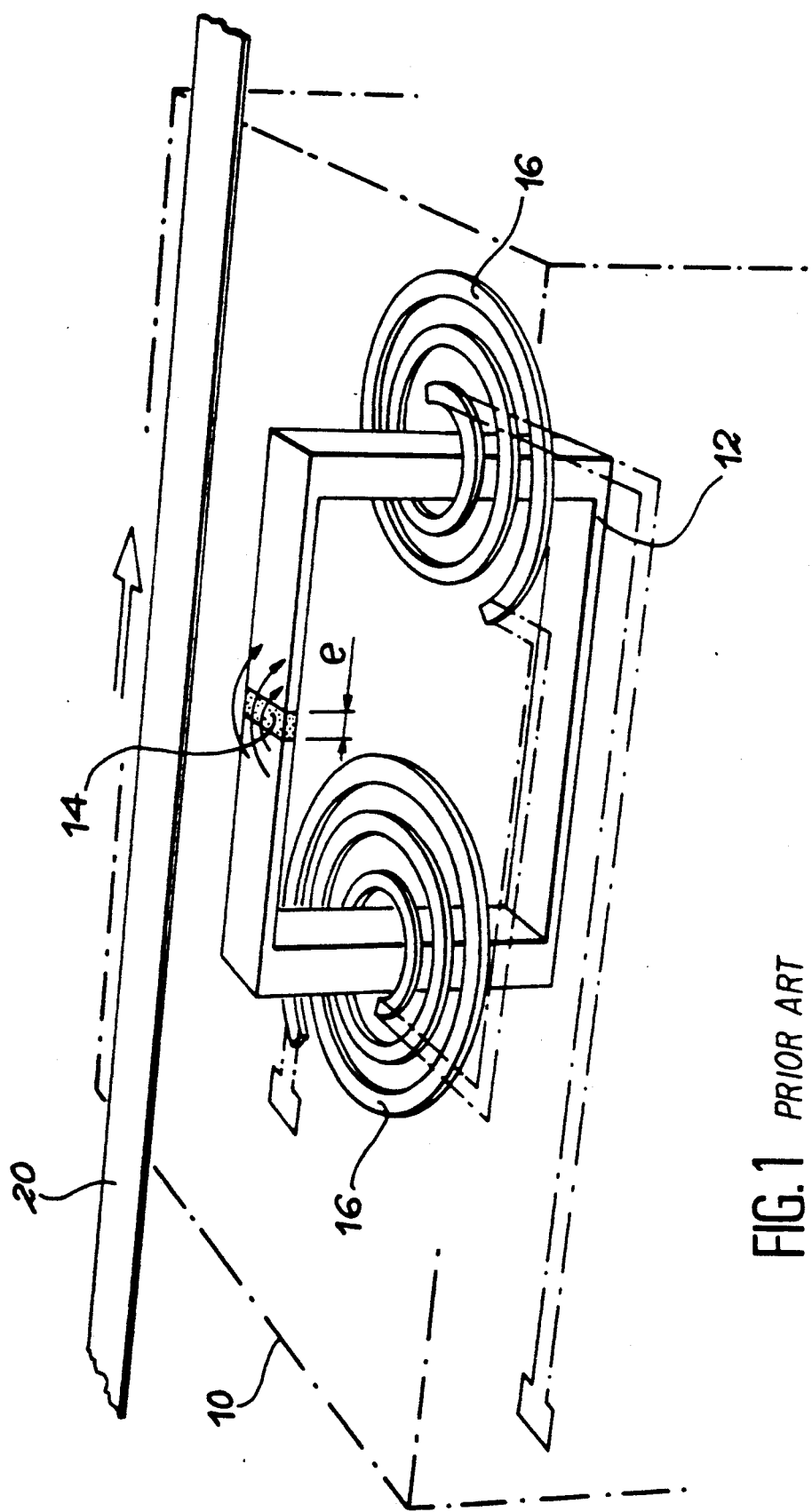
FIG. 1 already described, a prior art, horizontal magnetic head.
Figure 2:
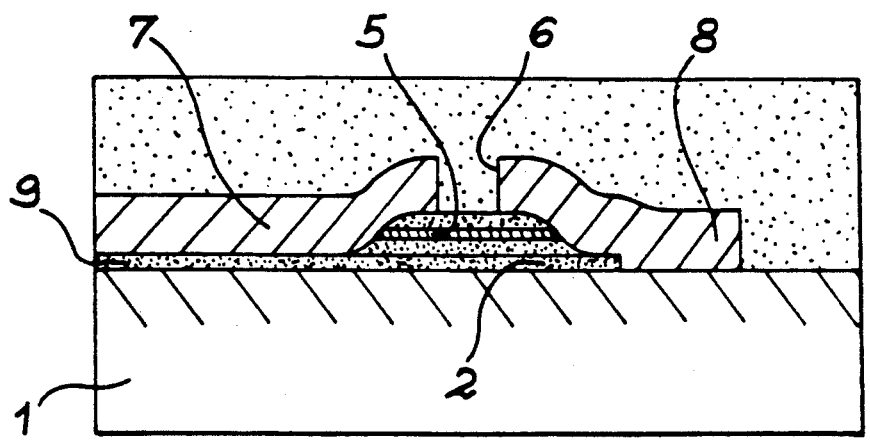
FIG. 2 already described, a prior art, magnetoresistant reading head.
Figure 3:
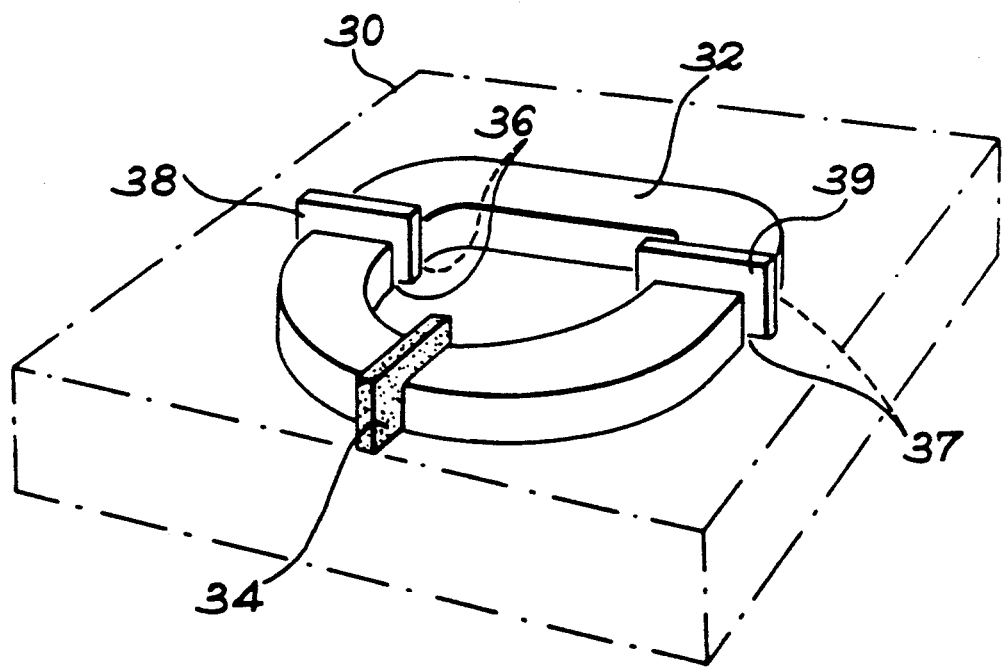
FIG. 3 already described, a thin film reading head with two magnetoresistors.
Figure 4:
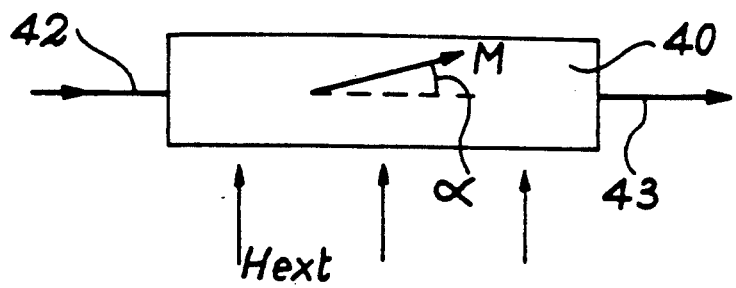
FIG. 4 already described, a magnetoresistor with its magnetization vector.
Figure 5:
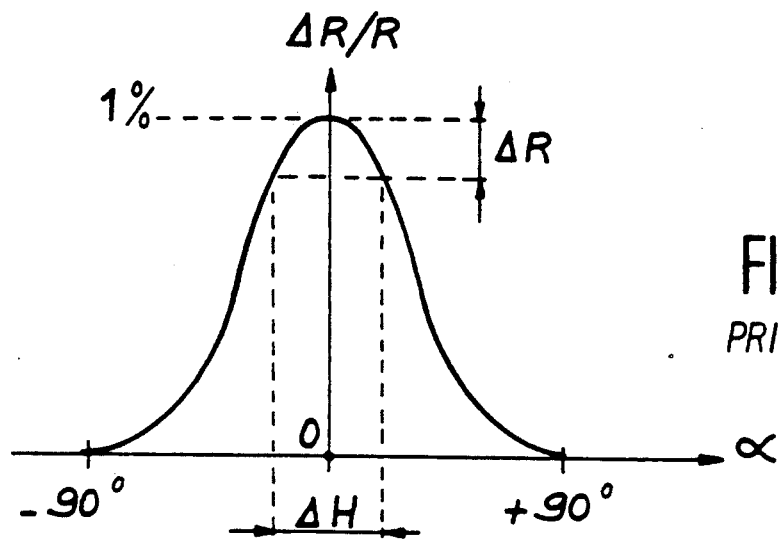
FIG. 5 already described, the relative resistance variations as a function of the switching of the magnetization.
Figure 7:
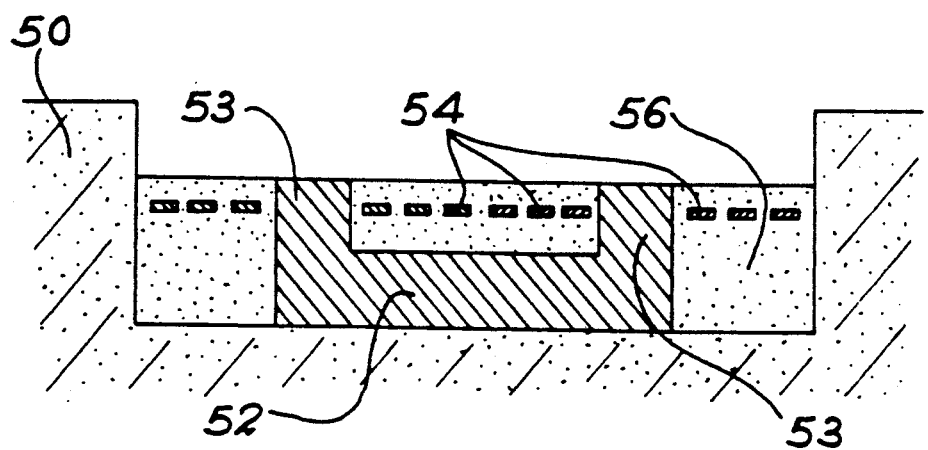
FIG. 7 a first stage of the process for producing the head according to the invention.

FIG. 7 shows a semiconductor substrate 50, e.g. of silicon, in which has been etched a recess. As described in EP-A-262 028, a horizontal magnetic layer 52 extended by two vertical connectors 53 is grown by electrolysis in the recess. This Si is followed by the formation of a coil 54 surrounding the connectors 53, the coil being embedded in an insulating layer 56. At this stage, the device obtained is in accordance with the prior art devices (cf. FIG. 5g of the cited European document).

A thin magnetoresistant material layer 60 is then deposited in the thus prepared recess. The material can be iron-nickel or any other known material. The layer thickness can be between 50 and 200 nm. This is followed by the deposition of a thin dielectric layer 62, e.g. of silica.

Figure 8:
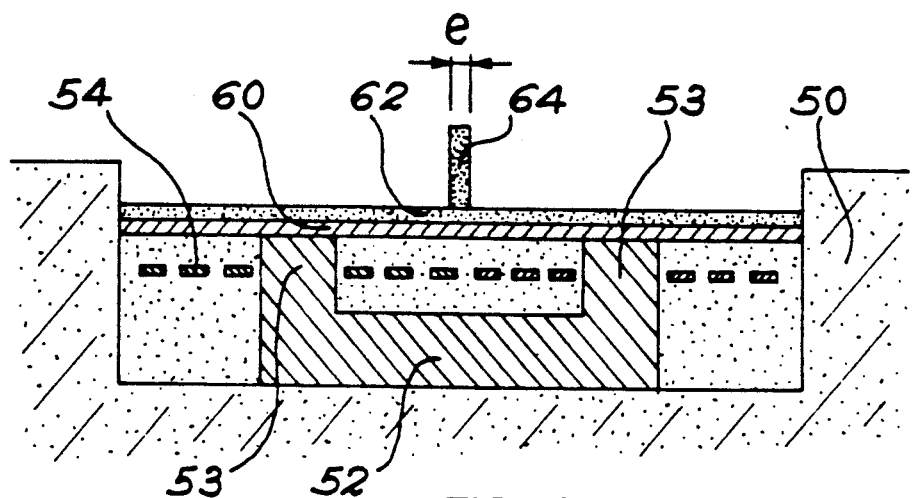
FIG. 8 a second stage of the process according to the invention.

This is followed by the formation of an amagnetic spacer 64 on the assembly (FIG. 8). It is pointless to describe the operations for producing this spacer, because they are well known in the art and are in particular described in the aforementioned European Patent 262 028 (or its corresponding U.S. Pat. 3 837 924) and 284 495. The spacer obtained has a length L and a thickness e.

Figure 9:
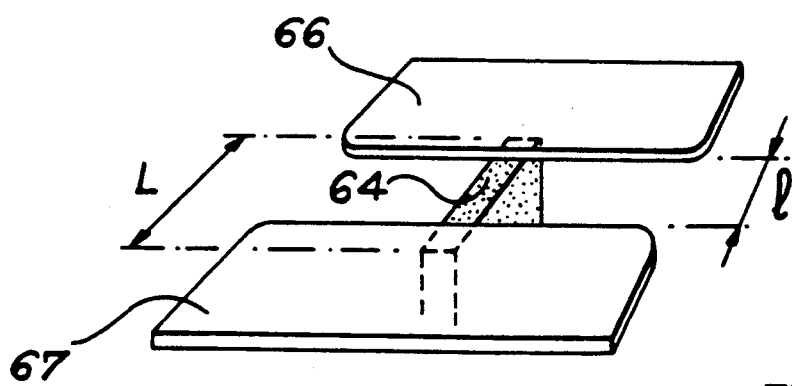
FIG. 9 a mask used for etching the magnetoresistant layer.

The following operation consists of etching requiring a mask with the shape shown in FIG. 9. This mask comprises two parallel strips 66,67 separated from one another by a space l, which is smaller than the spacer length L. This mask is placed above the spacer 64 and overlaps the same at its two ends.

Figure 10:
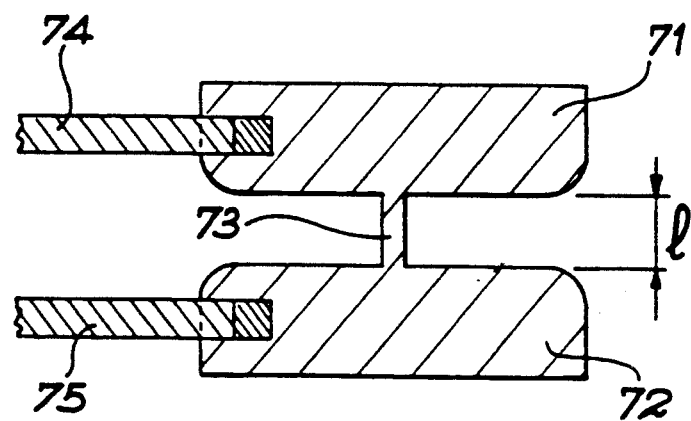
FIG. 10 the magnetoresistant pattern obtained.

Through the mask is etched the dielectric layer 62 and the magnetoresistive layer 60, the wall 64 also serving as a mask. Chemical or reactive ionic etching can be used. After etching, a H shaped pattern is obtained in the manner shown in FIG. 10 and has two lateral strips 71,72 and a central strip 73 of length l. By construction, the central strip is self-aligned with the spacer 64 and its length is slightly smaller than that of the spacer.

Two electric contacts 74, 75 are then made on the magnetoresistant layer 60 through the dielectric layer 62. These contacts are made on the two lateral strips 71, 72 as far away as possible from the central element 73 in order not to disturb the operation thereof.

Figure 11:
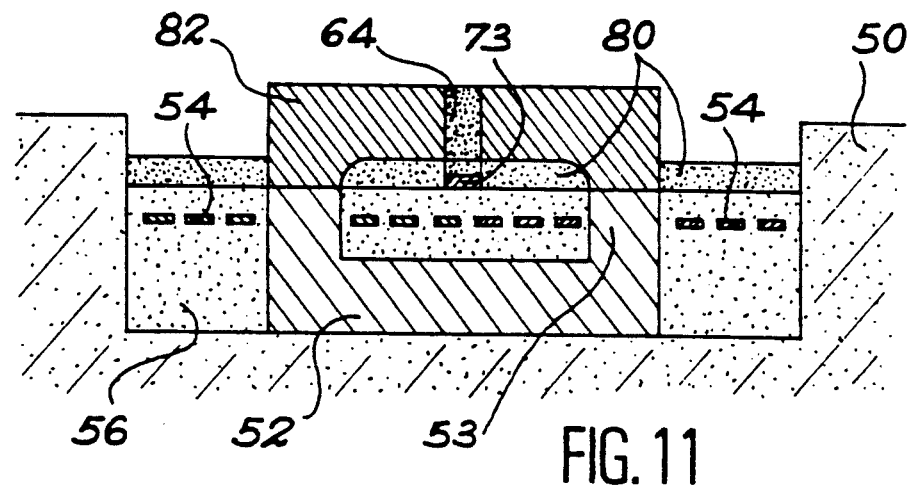
FIG. 11 in section, the head obtained according to the invention.

The process continues according to FIG. 11 by the deposition of an insulating layer 80, e.g. of silica and whose thickness is equal to that of the stack 60, 62 and then by the deposition of an upper, horizontal, magnetic layer 82 on either side of the spacer 64 and in contact with the connectors 53.

Figure 12:
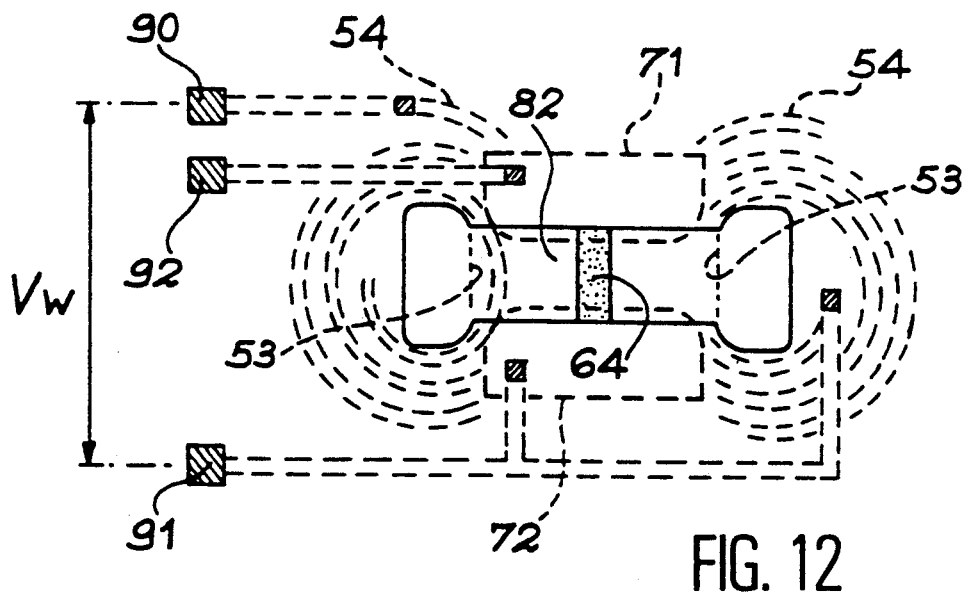
FIG. 12 in plan view, the head.

FIG. 12 shows the device obtained in plan view. It is possible to see the writing connections 90, 91 connected to the conductor coil 54 and the reading connections 91, 92 connected to the magnetoresistant pattern. In the illustrated embodiment, the connection 91 is common to writing and reading.

The magnetoresistant strips 71, 72 and/or the connectors 53 are profiled so as not to come into contact with one another. In the illustrated embodiment, the inner edges of the strips 71, 72 are slightly rounded, which can be obtained by giving the etching mask the corresponding shape (cf. FIG. 9).

Figure 6:
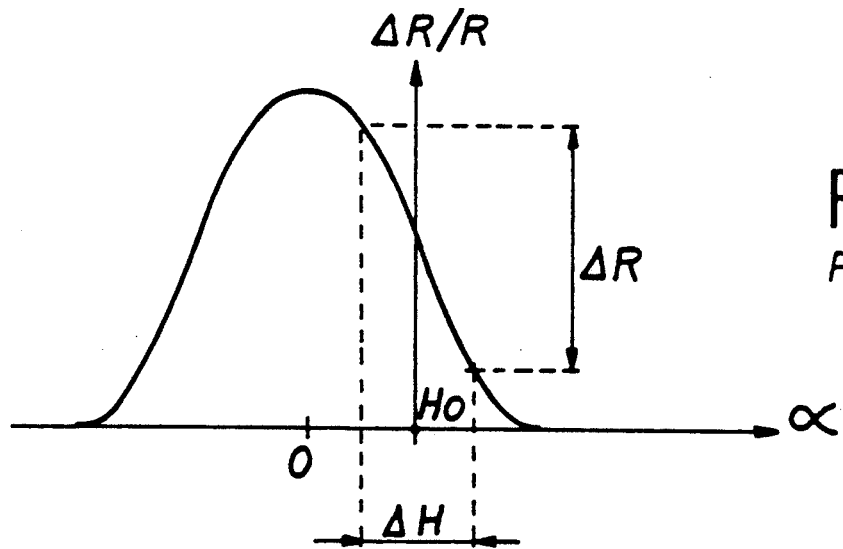
FIG. 6 the same variations when applying a permanent field.
Figure 13:
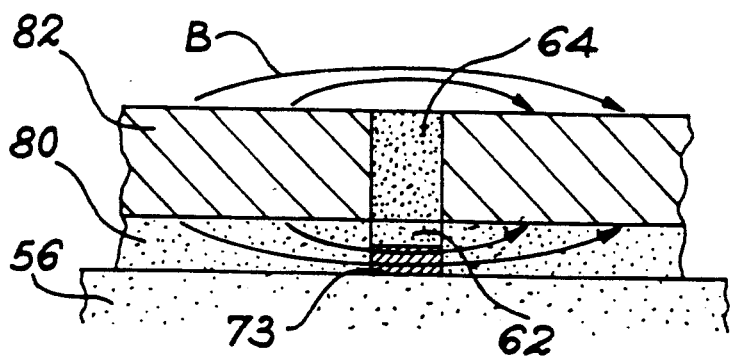
FIG. 13 the lines of the polarization field in the vicinity of the magnetoresistant element.
Figure 14:
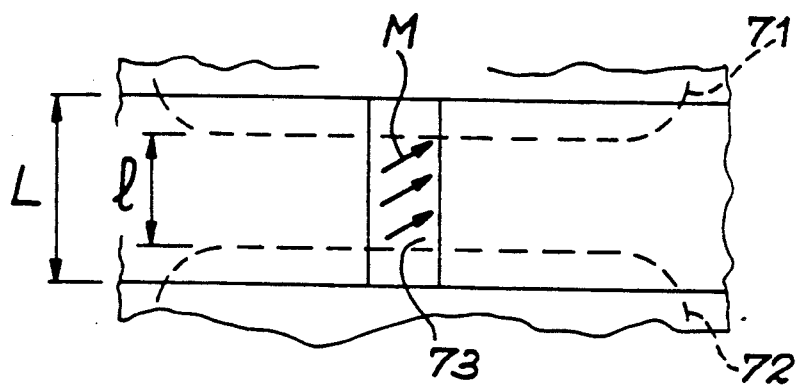
FIG. 14 the general orientation of the induction in the magnetoresistant strip.

The head obtained then functions as follows. On writing, the head functions normally by the supply of the coil 54 with the aid of the connections 90, 91. The head is able to write on a track, whose width is equal to L, i.e. the length of the spacer 64. On reading, the same coil is excited by a very weak current, which is just sufficient to rotate the magnetization M of the magnetoresistant strip 73 by 45° with respect to the magnetization direction in the inoperative state. FIG. 13 shows the leakage field produced at the air gap and in particular to the rear thereof and the magnetic coupling with the layer 73. FIG. 14 shows the resulting orientation of the induction M. This magnetization will turn from $+\alpha$ or $-\alpha$, as a function of the longitudinal magnetization direction recorded on the track passing in front of the air or head gap. This will lead to a resistance variation ΔR in accordance with the mechanism referred to hereinbefore in conjunction with FIG. 6.

Figure 15:
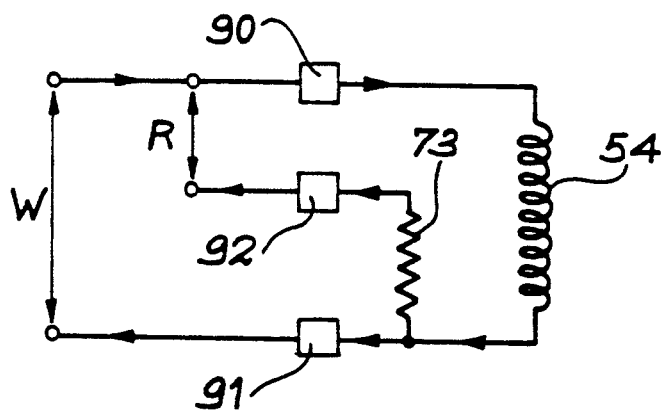
FIG. 15 the equivalent electric diagram of the reading and writing means.

FIG. 15 shows that the reading current polarizing the magnetoresistant element flows through the connections 90, 92. The writing current flows through the connections 90 and 91. Thus, there is a reading signal R and a writing signal W.

On reading, only the strip 73 will be sensitive to the magnetically recorded information. Thus, the reading current density in the two lateral strips 71, 72 remains low. Moreover, as the dimensions of the strips are much larger than those of the information bits, they are unable to distinguish the latter. Therefore the head will not read information written on the tracks adjacent to the read track.

Moreover, due to the fact that the central strip 73 is etched in the same magnetic layer 60 and as the two lateral strips, it is possible to ensure an excellent magnetic continuity in the thin magnetoresistant layer, particularly with regards to the magnet domains in the central strip 73.

It should be noted that the operating mode described is not the only mode possible. The orientation of the magnetization of the magnetoresistant layer to 45° in the inoperative state can be obtained as a result of an induced magnetocrystalline anisotropy, if the magnetostatic coupling is adequately strong between the magnetoresistant element and the pole pieces to reduce the demagnetizing fields of the magnetoresistant element. In this case, it is no longer necessary to have a conductor coil, so that the head is then only a reading head.

Figure 16:
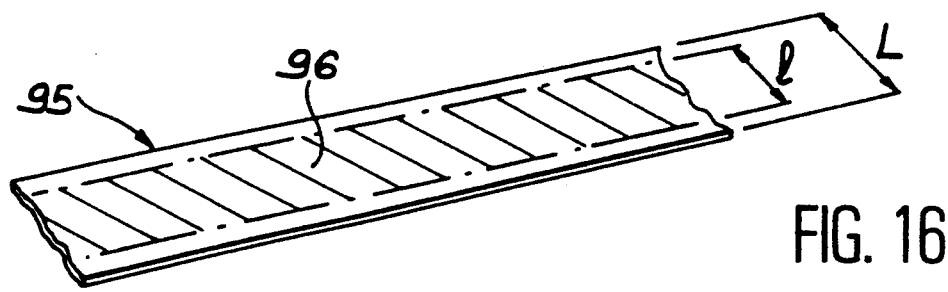
FIG. 16 a track with its writing zone and its reading zone.

Finally, and as is clear from FIG. 13, the magnetoresistant strip 73 is completely embedded in the structure a few microns beneath the flight plane. Therefore the magnetoresistant element is well protected against corrosion, shocks, etc. FIG. 16 shows a track 95 written over a width L and read over its central portion 96 of width 1.

I claim:
1. A magnetic reading head comprising:
   a horizontal lower magnetic layer;
   a horizontal upper magnetic layer interrupted by a gap filled with a non-magnetic spacer, said spacer having a predetermined length (L) and thickness;
   two magnetic vertical connectors connecting said lower and upper magnetic layer;
   a H-shaped magnetoresistant element with two large strips and a ribbon linking said two large strips, said ribbon being placed beneath said spacer and having a predetermined length (l) less than said predetermined length (L) of said spacer and a predetermined thickness equal to said predetermined thickness of said spacer; and
   two reading terminals connected to contacts made on said two large strips wherein said head being adapted to read a track written over a width 1 less than the width L of the track.

2. Magnetic head according to claim 1, further comprising a conductor coil surrounding said two magnetic connectors and being joined to the two writing terminals.

3. Magnetic head according to claim 2, wherein one of said two writing terminals connected to said coil coincides with one of said two reading terminals connected to magnetoresistant ribbon.

* * * * *